(12) United States Patent
Carlson

(10) Patent No.: US 9,959,771 B1
(45) Date of Patent: May 1, 2018

(54) UNMANNED AERIAL VEHICLE ROUTING USING REAL-TIME WEATHER DATA

(71) Applicant: Amazon Technologies, Inc., Seattle, WA (US)

(72) Inventor: Ty Loren Carlson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 14/975,547

(22) Filed: Dec. 18, 2015

(51) Int. Cl.
| | |
|---|---|
| *G08G 5/00* | (2006.01) |
| *B64C 39/02* | (2006.01) |
| *G06Q 10/08* | (2012.01) |
| *B64D 47/08* | (2006.01) |

(52) U.S. Cl.
CPC ......... *G08G 5/0039* (2013.01); *B64C 39/024* (2013.01); *B64D 47/08* (2013.01); *G06Q 10/083* (2013.01); *G08G 5/0034* (2013.01); *G08G 5/0091* (2013.01); *B64C 2201/128* (2013.01)

(58) Field of Classification Search
CPC .. G08G 5/0039; G08G 5/0034; G08G 5/0091; B64C 39/024; B64C 2201/128; B64C 2201/141; B64D 47/08; G06Q 10/083
See application file for complete search history.

(56) References Cited

U.S. PATENT DOCUMENTS

| | | | |
|---|---|---|---|
| 2016/0125740 A1* | 5/2016 | Pasko | G08G 5/0034 701/528 |
| 2016/0216711 A1* | 7/2016 | Srivastava | B64D 1/02 |

* cited by examiner

*Primary Examiner* — Todd Melton
(74) *Attorney, Agent, or Firm* — Lee & Hayes, PLLC

(57) ABSTRACT

Weather data is used to create and/or update a flight plan prior to and/or during flight by an unmanned aerial vehicle (UAV). The weather data may be received using sensors onboard the UAV and/or the weather data may be received from other sources, such as weather aggregators, other UAVs, other vehicles, and/or local weather stations. In some embodiments, a UAV may be prematurely grounded after initiating flight toward a destination in response to some weather conditions identified in near real-time weather data, such as heavy winds and/or heavy precipitation. In various embodiments, the UAVs may leverage air stream information included in the weather data to cause flight along with an air stream, and thereby reduce power resources used to fly to a destination.

20 Claims, 10 Drawing Sheets

US 9,959,771 B1

UNMANNED AERIAL VEHICLE ROUTING USING REAL-TIME WEATHER DATA

BACKGROUND

Unmanned aerial vehicles (UAVs) vary in degrees of sophistication. For example, UAVs used by hobbyists often rely completely on receipt of control signals from a user-operated remote control device. Thus, these UAVs rely on a user to provide most or all navigational instructions. More advanced UAVs may determine some navigational instructions without direct input. These UAVs may receive high level instructions (such as waypoints, a destination, and/or other parameters), and may implement logic to navigate through airspace based on the high level instructions and other information accessed by sensors on the UAVs. For example, some UAVs may access global positioning satellite (GPS) systems to obtain current location information while some UAVs may communicate with a command station using a mobile telephone network to exchange information, log events, and for other reasons.

Due to the physical attributes and design of many UAVs, weather may have a large impact on an ability of some UAVs to perform specified tasks, such as travel along a predetermined route and deliver a package. For example, when a UAV is subjected to high winds and/or gusty winds, the UAV may not be able to maintain a heading, maintain altitude, or complete a task given limited battery power. In particular, UAVs that rely on multiple rotors that are generally oriented to support hover flight may experience acute difficulty when flying into a heavy headwind. Precipitation, including heavy rain, snow, sleet, and freezing rain may also impede flight of a UAV.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
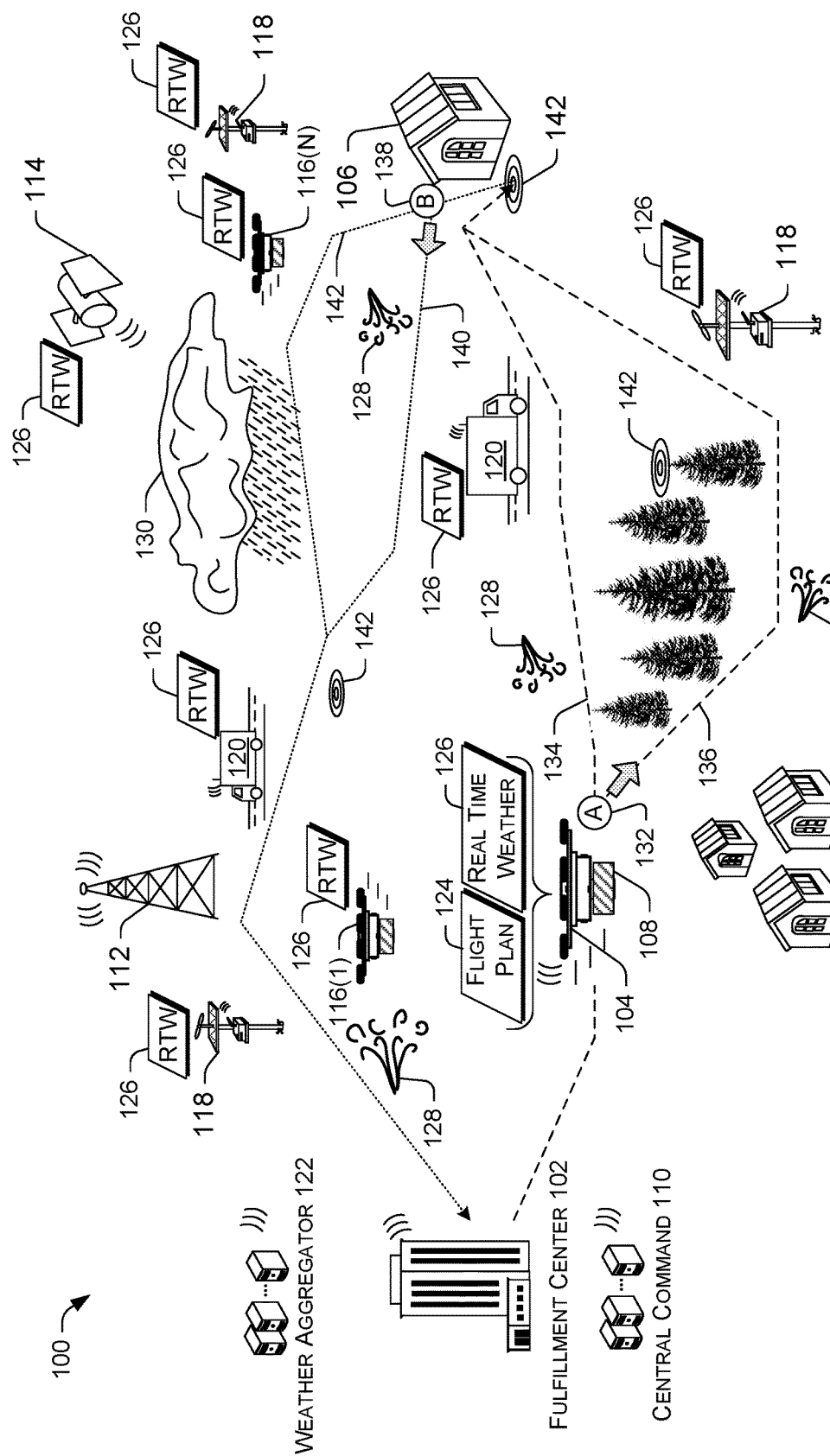
FIG. 1 is a schematic diagram of an illustrative environment that includes unmanned aerial vehicle (UAV) collecting real-time weather data from one or more sources and modifying flight data based at least partly on the weather data.

This disclosure is directed at least partly to using real-time weather data to create and/or update a flight plan during flight by an unmanned aerial vehicle (UAV), including grounding the UAV in response to some weather conditions identified in the weather data. The UAV may be used to deliver packages to customers, among other possible tasks performed by a UAV. The weather data may be received using sensors onboard the UAV and/or the weather data may be received from other sources, such as weather aggregators (e.g., weather companies, cloud computing service aggregators, etc.), other UAVs, other vehicles, and/or local weather stations (e.g., weather poles, weather balloons, etc.). The UAVs may then use this current weather data, which may be real-time weather data or near real-time weather data. As discussed herein, the term "real-time" weather data is intended to include "near real-time weather data" unless otherwise indicated. The near real-time weather data may include delays accounting for latency due to data transfer and processing, intervals of reporting by weather collection devices (e.g., reported every 30 seconds, 60 seconds, etc.), and/or similar delays or latency.

When a customer places an order for one or more items to be delivered, a system may leverage weather data to determine delivery times using different modes of delivery. One mode may be delivery using a UAV. The flight capabilities of a UAV may be affected by weather conditions, and thus the delivery times, choice of UAV, the UAV's useful load for the designated route, (or delivery time window) may be determined to compensate for weather conditions. A system may schedule deliveries of packages by different UAVs at different times based on forecasted weather. For example, an order may be processed by a particular fulfillment center based on the forecasted weather. In some instances, a plan may be used to leverage forecasted air streams to schedule a UAV to travel along with a direction of the air/wind when traveling toward a destination. The scheduling may select different types of UAV to perform different delivery tasks based on the forecasted weather. For example, forward flight UAVS, having propulsion systems that can be directed to produce thrust substantially horizontal with the horizon, may be used in flight paths that require travel into or toward moderate or heavy winds. Larger UAVs may also be deployed at times when weather is forecasted to be windier, while smaller UAVs may be more readily used at times forecasted to be calm and have little or no wind.

Just prior to flight by a UAV that is to deliver a package, the UAV may receive a flight plan and/or other data to assist the UAV in delivering the package to a destination. The flight plan may be based on more recent weather data than the weather data used at the time of order. The flight plan may minimize travel into heavy wind, prioritize drops (if conducting multiple deliveries) based on weather forecasts, and so forth. The weather data may include detailed weather information about localized weather, such as to indicate squalls, microbursts of weather, and/or other weather occurrences that may include precipitation, fog, air temperatures below freezing, high winds, and/or other weather that may disrupt travel by a UAV, During flight, the UAV may obtain the real-time or near real-time weather data from one or more sources, including from sensors on the UAV. The UAV may update a flight plan and/or create a new flight plan based on this weather data.

In some embodiments, the flight controller of the UAV may readily make control decisions based on the real-time weather. As discussed herein, the update of a flight plan includes changes by the flight controller of the control decisions without necessarily establishing new waypoints, for example. Thus, the flight controller may make minor changes in heading based on the real-time weather data while continuing to navigate toward a predetermined waypoint or continuing to achieve other objectives in a flight plan.

In some instances, the UAV may land prior to reaching a planned destination in response to the weather data, such as when the weather data includes high winds, gusty winds, and/or heavy precipitation. The UAV may then perform various actions to alert people and/or other devices about the landing. For example, the UAV may send a message to a customer to alert the customer when the flight is delayed or will arrive later than expected. The UAV may resume flight after receiving additional weather data, which again may be received from the sensor(s) onboard the UAV and/or from other external sources.

In some embodiments, the UAV may leverage weather data to optimize or improve flight efficiency. For example, a central command may create flight plans for UAVs that favor travel in a direct of wind and disfavor travel in a direction into the wind. Land vehicles may be used to transport the UAV and/or packages in an upwind direction. The UAVs may interact with land based vehicles to obtain transit by a land based vehicle to position the UAV upwind of a next waypoint that the UAV will fly toward.

The techniques, UAVs, and systems described herein may be implemented in a number of ways. Example implementations are provided below with reference to the following figures.

FIG. 1 is a schematic diagram of an illustrative environment 100 that includes unmanned aerial vehicle (UAV) collecting real-time weather data from one or more sources and modifying flight data based at least partly on the weather data. The environment 100 includes a fulfillment center (FC) 102 where a UAV 104 may originate a flight directed to a destination 106, such as a location associated with a recipient of a package 108 transported by the UAV 104. The UAV 104 may receive some flight information and/or commands from a central command 110. The central command 110 may communicate with the UAV 104 via a wireless network, such as a network that utilizes one or more antennas 112 or satellites 114. The antennas 112 and satellites 114 may provide other information, including weather data to various devices. The UAV 104 may also, at times, conduct autonomous flight, such as during intervals between communications from the central command 110 and/or when communication with the central command 110 is not available. In some embodiments, the antennas, such as cell towers, may include weather stations that leverage a short message service (SMS) backchannel or other communication channel to communicate the weather information to other entities and/or vehicles, such as the UAV 104.

The UAV 104 may sense and collect weather information for its location during flight, such as by determining a wind speed and direction, precipitation, temperature, fog or visibility, and/or other weather information using onboard sensor(s). This information may be shared with the central command 110, other UAVs, other vehicles, and/or other entities. The UAV 104 may also use this information locally, as discussed below.

The UAV 104 may also exchange information from other UAVs 116(1)-116(N), such as weather data collected from the UAVs 116, as well as exchange information with other weather collection devices, either directly or indirectly (e.g., through the central command 110). The other weather collection devices may include local weather stations 118, ground vehicles 120, and/or weather aggregators 122. The local weather stations 118 may be weather poles, weather balloons, and/or other devices that are stationed in the environment to directly sense and/or measure weather, such as wind speed, precipitation, fog or visibility, temperature, and/or other weather information. The ground vehicles 120 may include vehicles equipped with weather sensors that capture some weather data, such as wind speed, precipitation, fog or visibility, and/or temperature. For example, the ground vehicles 120 may be land-based delivery vehicles or common-carrier vehicles used to deliver packages to customers. The weather aggregators 122 may include resources or entities that combine weather information from multiple inputs (e.g., from the local weather stations, from UAVs and/or from the vehicles, to create weather forecasts and/or provide real-time weather information for a region. The weather aggregators 122 may be weather reporting companies, cloud computing service weather aggregators, and/or other entities.

The UAV 104 may include a flight plan 124, which may be initially created by the central command 110 and/or by the UAV 104 prior to flight of the UAV. The flight plan 124 is stored in memory of the UAV 104 and causes the UAV to fly to the destination 106, such as by traveling through waypoints tracked by a global positioning system (GPS) receiver of the UAV. The flight plan 124 may be initially created using weather data, such as a weather forecast provided by the weather aggregator 122. The flight plan 124 may include altitude information, and thus be three-dimensional. For example, a flight plan may be created to cause a UAV to fly over or under a weather system, as well as around the weather system depending on flight capabilities of the UAV and other possible constraints.

During flight, the UAV 104 (and the other UAVs 116) may collect real-time weather data 126, which may be collected by sensors onboard the UAV(s). The real-time weather data 126 may also include data from other devices, as discussed above, such as the other UAV 116, the weather aggregator 122, the local weather stations 118, and/or the ground vehicles, possibly via communications from the central command 110 and/or direct communications from the sources of the weather data. For example, the weather stations 118 may broadcast weather data that can be received by the UAV 104 during flight. The real-time weather data 126 may include data about winds 128, precipitation 130, fog or visibility, temperature, and/or other weather in the environment, sensed by the various devices described above.

The UAV 104 and/or the central command 110 may use the real-time weather data 126 to update the flight plan 124 and/or create a new flight plan for the UAV 104, which can replace/overwrite the flight plan 124. For example, the UAV 104 may include a flight plan that causes the UAV 104 to travel to a first waypoint "A" 132. At or prior to arriving at the waypoint A 132, the real-time weather data 126 may be used to update the flight plan (or create a new flight plan) to determine how best to travel to the next waypoint or the destination 106 based on the real-time weather data 132. For example, the flight plan 124 may, before an update, direct the UAV 104 along a route 134. However, based on the real-time weather data 126, the UAV 104 may be directed along a route 136. In some embodiments, the UAV 104 may be directed along the route 136 by a flight controller without necessarily updating a flight plan or all waypoints of the flight plan. The route 136 may be selected based on factors such as a direction of wind, which may include a headwind along the route 134 and a tailwind along the route 136. As another example, the UAV 104, at or prior to a second waypoint "B" 138, may select a route 140 instead of a route 142 based on presence of the precipitation 130 (possibly from a heavy storm) near the route 142. In some embodiments, routes may be selected based on known geographic features in an area, such as wind shadows caused by cliffs or tree lines, convergence zones, downdrafts, and/or other known features and/or frequently occurring phenomenon. Some phenomenon may be correlated with geographic features to enable identification of other possible occurrences of the phenomenon.

In some instances, UAV 104 may be directed to land and discontinue, at least temporarily, flight based on the real-time weather data 126. The UAV 104 may select a landing location 144 based on various considerations. Some of the landing zones may be predetermined as optimal landing zones for various reasons, such as presence of shelter, presence of battery charging equipment, and/or for other reasons. When no predetermined landing zone is within a threshold distance from the UAV that is attempting to land, then the UAV may survey nearby landscape to determine a good landing zone, such as using image analysis and/or other autonomous techniques which may or may not include communications with the central command 110.

In accordance with one or more embodiments, the UAVs may include a flight plan that coordinates with one of the vehicles 120 that is used to transport the UAV 104 and/or the package 108 in a direction into a headwind rather than causing the UAV to fly into the headwind. For example, at or prior to reaching the waypoint A 132, the UAV may coordinate with a vehicle and have the vehicle transport the UAV and/or the package along a ground route (e.g., a road, etc.) in a similar direction as the route 134, which is subject to a headwind as shown in FIG. 1. The vehicle may shuttle the UAV 104 to a location upwind, which may allow the UAV to primarily conduct flight with a tailwind. In some embodiments, land vehicles may be stationed at different locations in the environment 100 to transport UAVs and/or packages accordingly. In various embodiments, the UAV 104 may selectively coordinate with the land vehicles for this purpose, such as when the real-time weather data 126 indicates that use of a land vehicle is prudent. For example, when the real-time weather data 126 indicates a presence of high gusty winds, the UAV may land and coordinate with a land vehicle to accomplish a next segment of the route and/or complete the delivery of the package 108 to the destination 106.

Figure 2A:
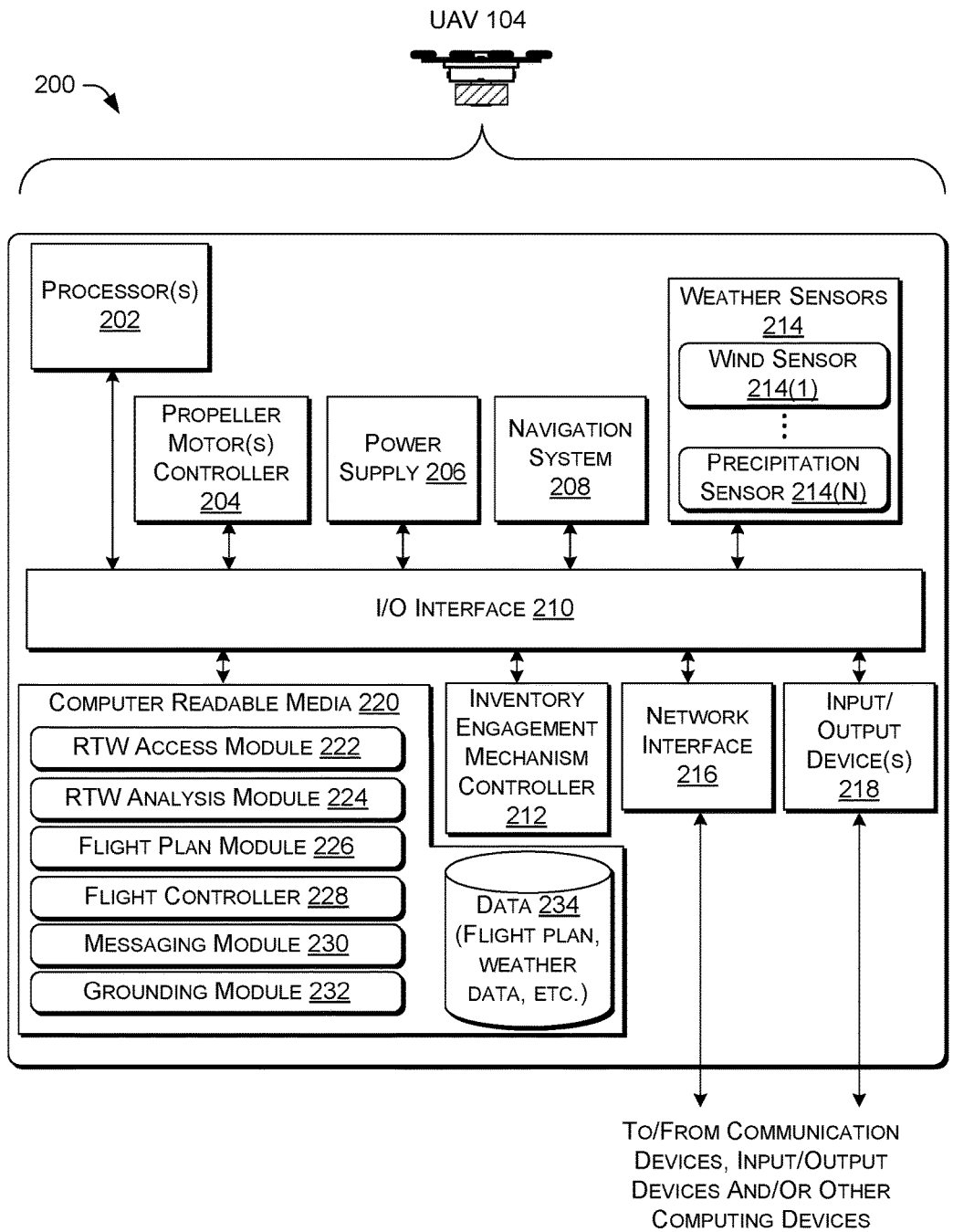
FIG. 2A is a block diagram of an illustrative UAV architecture.

FIG. 2A is a block diagram of an illustrative UAV architecture 200 of the UAV 104. The UAV architecture 200 may be used to implement the various systems, devices, and techniques discussed above. In the illustrated implementation, the UAV architecture 200 includes one or more processors 202, coupled to a non-transitory computer readable media 220 via an input/output (I/O) interface 210. The UAV architecture 200 may also include a propeller motor controller 204, power supply module 206 and/or a navigation system 208. The UAV architecture 200 further includes an inventory engagement mechanism controller 212, weather sensors 214, a network interface 216, and one or more input/output devices 218.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 220 may be configured to store executable instructions/modules, data, flight paths, and/or data items accessible by the processor(s) 202. In various implementations, the non-transitory computer readable media 220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 220 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 210 may be configured to coordinate I/O traffic between the processor(s) 202, the non-transitory computer readable media 220, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable media 220) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 220, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a GPS or other similar system that can be used to navigate the UAV to and/or from a location. The inventory engagement mechanism controller 212 communicates with the actuator(s) or motor(s) (e.g., a servo motor) used to engage and/or disengage inventory. For example, when the UAV is positioned over a level surface at a delivery location, the inventory engagement mechanism controller 212 may provide an instruction to a motor that controls the inventory engagement mechanism to release the inventory.

The weather sensors 214 onboard the UAV 104 may capture weather experienced by the UAV. The weather sensors may capture wind direction, wind speed, precipitation amounts, temperature, and/or weather information as the UAV is in transit and/or while the UAV is grounded. The weather sensors 214 may include a wind sensor 214(1), which may use a pivot tube and static port to determine a speed of wind. The weather sensors 214 may include a precipitation sensor 214(N) to measure precipitation. The weather sensors 214 may also include other sensors to measure temperature, thermal conditions, fog or visibility, pressure, airflow, and/or other weather attributes.

The network interface 216 may be configured to allow data to be exchanged between the UAV architecture 200, other devices attached to a network, such as other computer systems, and/or with UAV control systems of other UAVs. For example, the network interface 216 may enable wireless communication between numerous UAVs. In various implementations, the network interface 216 may support communication via wireless general data networks, such as a Wi-Fi network. For example, the network interface 216 may support communication via telecommunications networks such as cellular communication networks, satellite networks, and the like.

Input/output devices 218 may, in some implementations, include image capture devices, infrared sensors, time of flight sensors, accelerometers, lights, speakers, and other input/output devices commonly used in aviation. Multiple input/output devices 218 may be present and controlled by the UAV architecture 200. One or more of these sensors may be utilized to assist in landings as well as avoiding obstacles during flight.

In some embodiments, the computer readable media 220 may store a real-time weather (RTW) access module 222, a RTW analysis module 224, a flight plan module 226, a flight controller 228, a messaging module 230, and a grounding module 232, which are described in turn. The components may be stored together or in a distributed arrangement. The computer readable memory may also store data 234, such as a flight plan, waypoints, predetermined landing sites, a weather forecast provided in advance, and other data.

The RTW access module 222 may receive real-time weather data from the weather sensors 214 and/or other external sources, such as the other UAVs 116, the weather stations 118, the ground vehicles 120, and/or the weather aggregators 122, possibly via the central command 110.

The RTW analysis module 224 may aggregate and/or analyze the real-time weather data. Resulting data produced by the RTW analysis module 224 may be used to update flight plans, cause the UAV to be grounded, change operation by the flight controller, and/or cause other actions.

The flight plan module 226 may receive, maintain, update, and/or create a flight plan for use by the UAV, implemented by the flight controller 228 and navigation system. The flight plan module 226 may receive inputs from the RTW analysis module 224 and update the flight plan (or create a new one) accordingly, which may include different waypoints and/or other different navigational information based on results/data from the RTW analysis module 224.

The flight controller 228 may implement the flight plan as well as control the UAV in accordance with the navigation system. The flight controller 228 may make changes in a direction or conduct of flight based on the information from the RTW analysis module 224 without necessarily receiving a change in the flight plan.

The messaging module 230 may transmit messaging to the customer, directly or indirectly (through the central command), based on changes to the flight plan and/or grounding of the UAV. For example, the messaging module 230 may transmit a message to a customer associated with a package to be delivered by the UAV to indicate a change in a delivery time window, and/or other changes.

The grounding module 232 may assist the flight controller 228 in grounding/landing the UAV due to weather. The grounding module 232 may select a landing site from predetermined landing sites and/or using a real time landing site selection process, which may leverage computer vision from images gathered by an imaging device of the UAV 104. The grounding module 232 may implement a protocol to resume flight if the grounding is due to weather. In some embodiments, the grounding module 232 may execute a test flight to enable the UAV to determine if the weather conditions have improved. This may be helpful when the UAV is grounded at a landing site that is sheltered from at least some weather.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Additional information about the operations of the modules of the UAV 104 is discussed below with reference to the flow diagrams.

Figure 2B:
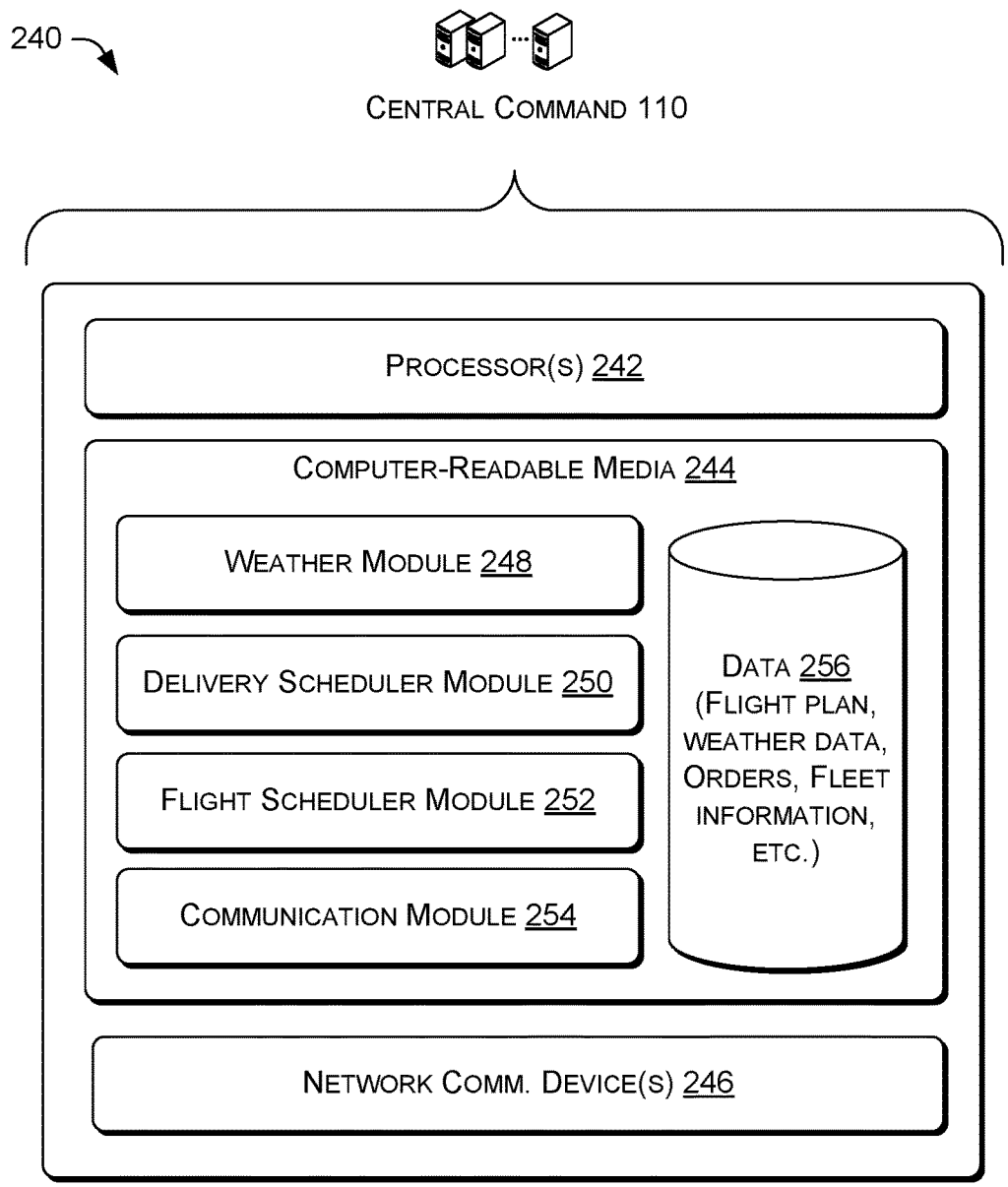
FIG. 2B is a block diagram of an illustrative computing architecture of a central command that exchanges communications with the UAV shown in FIG. 2A.

FIG. 2B is a block diagram of an illustrative computing architecture 240 of the central command 110 that exchanges communications with the UAV 104. The computing architecture 240 may include one or more processors 242 and one or more computer readable media 244 that stores various modules, applications, programs, or other data. The computer-readable media 244 may include instructions that, when executed by the one or more processors 242, cause the processors to perform the operations described herein for the central command 110. The architecture 240 may also include network communication devices 246 to facilitate communication with other devices, such as using wired and/or wireless networks.

Embodiments may be provided as one or more a computer programs including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a weather module 248, a delivery scheduler module 250, a flight scheduler module 252, and a communication module 254, which are described in turn. The components may be stored together or in a distributed arrangement. The computer-readable media 242 may also include data 256. The data 256 may include a flight plan, schedules for UAVs and/or other vehicles, weather data (real-time and/or forecasts), orders, fleet information, and/or other relevant data.

The weather module 248 may receive weather information from one or more different sources, such as the UAV 104 (via onboard sensors), the other UAVs 116, the weather stations 118, the ground vehicles 120, and/or the weather aggregators 122. The weather module 248 may then processes this information for use by other modules that may use weather information in decision making operations. In some embodiments, the weather module 248 may receive weather data from various different locations, such as from UAVs, ground vehicles, and weather stations. The weather module 248 may aggregate and extrapolate this information to create predictions for weather in other areas not currently sampled as well as forecast weather in some areas. For example, the weather module 248 may leverage historical information about past occurrences of squalls, microbursts of weather, and/or other weather occurrences that may include precipitation, fog, air temperatures below freezing, high winds, downdrafts, and/or other weather that may disrupt travel by a UAV. The weather module 248 may provide location specific information to other devices, such as the UAV 104, as well as regional information. The location specific information may be specific to a route to be traveled by the UAV and/or alternative routes that can be used by the UAV.

The delivery scheduler module 250 may process determine a type of delivery for a specific order, which may be determined based on a user selection at a time of the order or after the order. The delivery scheduler module 250 may provide different delivery options for selection. The delivery scheduler module 250 may determine weather information from the weather module 248 and output delivery estimates based on the weather information. For example, for a given order, the delivery scheduler module 250 may determine a time window for deliver to an address by UAV based on forecasted weather information from the weather module 248.

The flight scheduler module 252 may schedule UAVs to perform the deliveries based at least in part on the output from the delivery scheduler module 250 and the weather module 248. The flight scheduler module 252 may select certain UAVs to perform certain deliveries based on the weather information provided by the weather module 248, such as assign larger UAVs to perform flights that may experience greater winds and/or precipitation.

The communication module 254 may facilitate communications between UAVs, as well as with customers. The may provide an update to a customer of a delivery time window in response to weather information from the weather module 248 and/or from a message received from the UAV, such as a UAV that has grounded due to bad weather. In some embodiments, the communication module 254 may enable a user to change a delivery type, cancel an order, and/or make other selections based on a status of a flight of a UAV and/or other considerations.

Additional information about the operations of the modules of the central command 110 is discussed below with reference to the flow diagrams.

FIGS. 3-8 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

Figure 3:
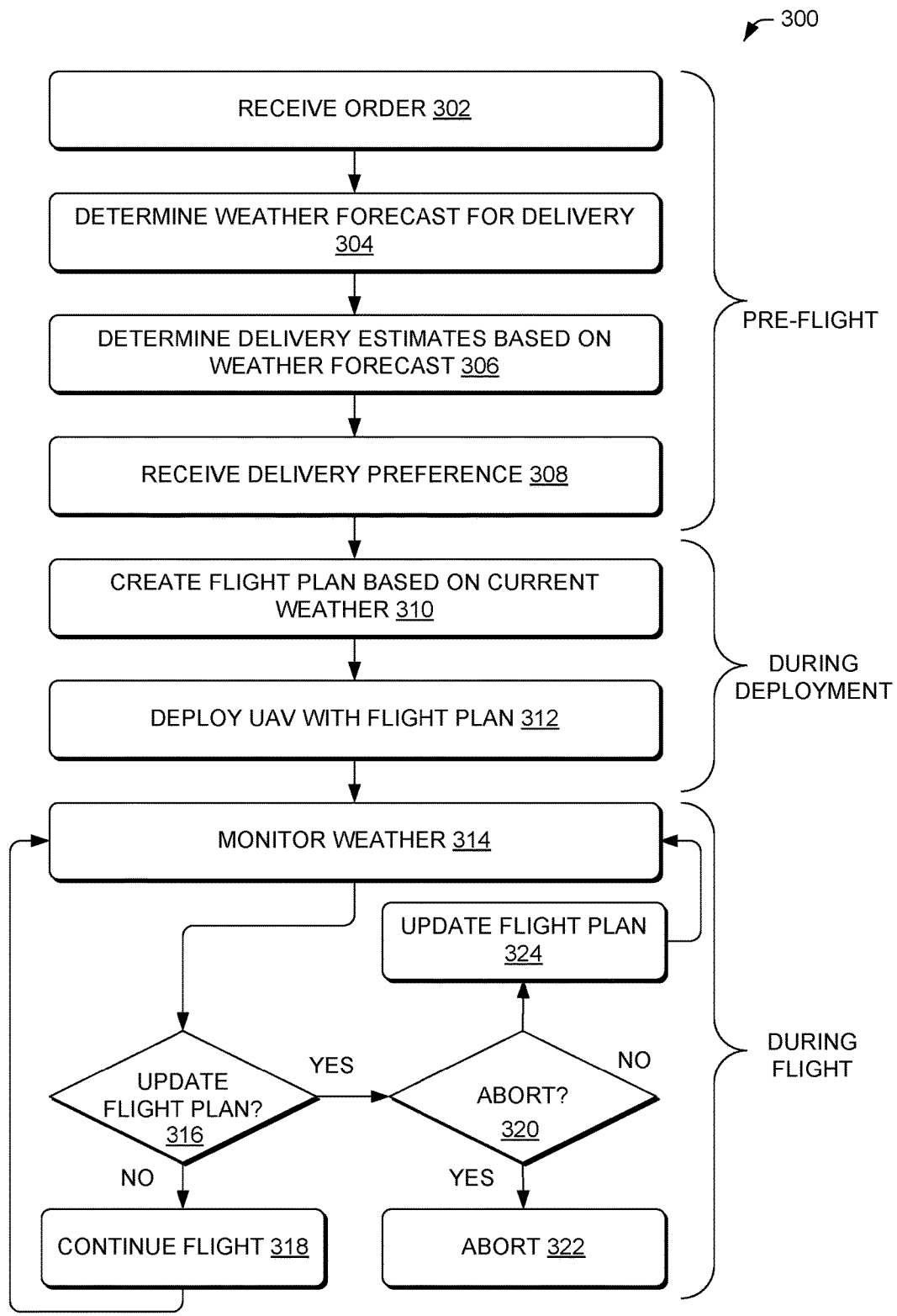
FIG. 3 is a flow diagram of an illustrative process that includes pre-flight, deployment, and during flight operations that utilize real-time weather information.

FIG. 3 is a flow diagram of an illustrative process 300 that includes pre-flight, deployment, and during flight operations that utilize real-time weather information. The process 300 is described with reference to the environment 100 and the architectures 200 and 240. The process 300 is organized by different states of a delivery by a UAV, including a pre-flight stage (operations 302-308), a deployment stage (operations 310 and 312), and a during flight state (operations 314-324).

At 302, the delivery scheduler module 250 may receive data associated with an order to be delivered to a customer. The data may include attributes of the order, customer information (delivery location, etc.), and/or other information that may be used to determine delivery parameters.

At 304, the weather module 248 may determine a weather forecast for different delivery options available for the order determined at the operating 302. For example, for options that include use of a UAV, the weather module may provide forecast weather information for routes likely to be traveled by the UAV to a destination associated with the order.

At 306, the delivery scheduler module 250 may determine delivery estimates (or delivery time windows) for the order based on the weather forecast and other parameters associated with the order. For example, if the order includes heavy items, than the estimates may reflect availability of larger UAVS to perform the delivery, and so forth. The weather forecast may include information that results in minor changes in the delivery estimates, such a forecast for headwind which may cause the delivery scheduler module 250 to add additional time to the delivery estimate. In some instances, the weather forecast may cause use of a route different than an originally planned route, which may cause the delivery scheduler module 250 to increase an amount of time for a delivery. In various instances, the weather forecast may make certain types of deliveries at certain times to be unavailable as determined by the delivery scheduler module 250, such as during presence of a heavy storm, freezing rain or hail, and/or presence of other inhibiting weather conditions.

At 308, the delivery scheduler module 250 may receive a delivery preference, possibly from user input to options presented to a user device during the order process. The delivery scheduler module 250 may provide the delivery preference to the flight scheduler module 252 for scheduling the flight of the UAV, when applicable, to deliver the order to the customer.

At 310, the flight scheduler module 252 may create a flight plan based on current weather received from the weather module 248, which may be more recent weather information than the weather information used in the operation 306. The flight plan may include a selection of waypoints and/or other routes and/or objectives based on the current weather information. For example, the flight plan may be created to route the UAV along a route that has limited or no exposure to a headwind, precipitation, and/or other weather that may cause the UAV to fail in its objective to deliver the order to the customer. In some embodiments, the flight plan may cause the UAV to travel in a downwind direction (along with the wind), and use land vehicles to position the UAV in upwind locations, as further discussed below.

At 312, the flight scheduler module 252 may deploy the UAV with the flight plan and possibly other data to accomplish the delivery. For example, the flight scheduler module 252 may upload the flight plan, a most recent weather forecast, intermediate landing sites, and/or other data to the UAV along with normal flight plan information (e.g., waypoints, objects to avoid, etc.).

At 314, the weather module 248 and/or the RTW access module 222 may continue to collect weather information which may be used to update the flight plan the UAV during flight and/or create a new flight plan, among other possible uses. The weather data may be current and specific to the location of the UAV.

At 316, a determination may be made as whether to update the flight plan (or create a new flight plan) based on the weather data obtained at the operation 314. For example, if the UAV experiences heavy rain, high winds, or other bad weather, the UAV may determine to change heading or otherwise update the flight plan. When the UAV or the central command 110 determines not to update the flight plan (following the "no" route from the decision operation 316), then the process 300 may advance to an operation 318 and continue a current flight plan. When the UAV or the central command 110 determines to update the flight plan (following the "yes" route from the decision operation 316), then the process 300 may advance to a decision operation 320.

At 320, the UAV and/or the central command 110 may determine whether to abort a flight, at least temporarily, based on the weather data from the operation 314. For example, aborting may include grounding the UAV until weather conditions permit the UAV to continue flight. When the UAV or the central command 110 determines to abort flight (following the "yes" route from the decision operation 320), then the process 300 may advance to an operation 322 and abort flight plan. When the UAV or the central command 110 determines not to abort flight (following the "no" route from the decision operation 320), then the process 300 may advance to an operation 324.

At 324, the UAV and/or the central command 110 may update the flight plan (or create a new flight plan) based on the weather data from the operation 314. For example, the update/new flight plan may include a different waypoint between the UAV's current position and the designation of the UAV. The process may loop from the operations 318 and 324 to the operation 314 until the UAV flight is complete.

Figure 4:
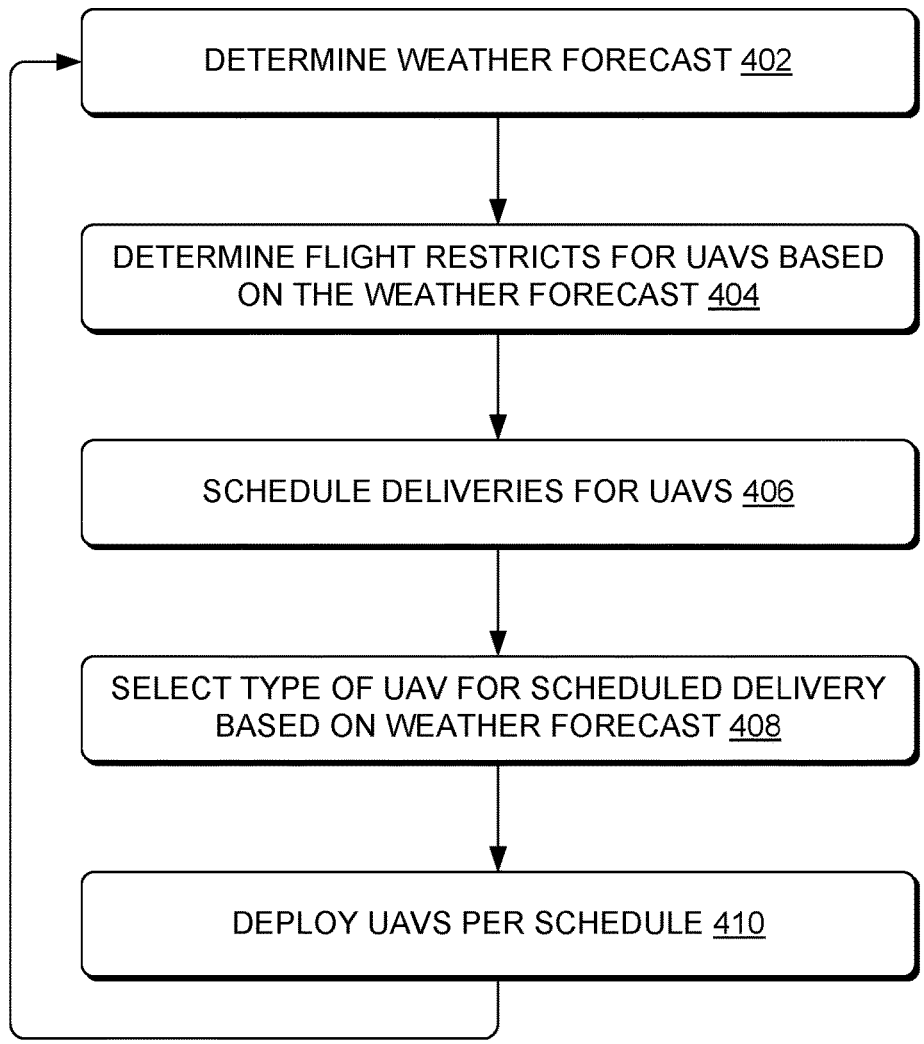
FIG. 4 is a flow diagram of an illustrative process to schedule deliveries for specific types of UAVs based on real-time weather.

FIG. 4 is a flow diagram of an illustrative process 400 to schedule deliveries for specific types of UAVs based on real-time weather. The process 400 is described with reference to the environment 100 and the architecture 240.

At 402, the weather module 248 may determine a weather forecast that pertains to a delivery of an order. The weather forecast may include weather data from UAVs and other vehicles that are deployed in a region associated with the delivery. The weather forecast may include weather data from other devices, such as local weather stations, weather aggregators, and other entities.

At 404, the flight scheduler module 252 may determine flight restrictions for UAVs based on the weather forecast. For example, if the weather forecast includes a forecast for very high winds (e.g., in excess of 50 mph, etc.), heavy precipitation, and/or other bad weather, the flight scheduler module 252 may determine that no UAVs or only some UAVs may be deployed into affected regions at the forecasted times of the bad weather. The flight scheduler module 252 may perform a risk analysis of UAV travel in certain types of weather. The risk analysis may be used to determine a cost of the delivery, a variance or window of time for a delivery, and/or whether the delivery is available for selection. As an example, the when a risk is low (e.g., good weather, etc.) and the fleet of UAVs is relatively underutilized, the central command 110 may provide an indication to an order system or delivery system to offer UAV deliveries at a discount, possibly to select customers.

At 406, the flight scheduler module 252 may schedule deliveries of the orders by specific UAVs from specific fulfillment centers based on any restrictions determined at the operation 404 and the weather determined at the operation 402. In some embodiments, the flight scheduler module 252 may select for an order to be originated from a specific fulfillment center of a group of fulfillment centers based on the specific fulfillment center being upwind from a destination of the delivery. The may enable a UAV to travel downwind toward the destination and preserve battery life, for example. The flight scheduler module 252 schedule some deliveries during more calm times (e.g., early morning, etc.), which may utilize smaller UAVs.

At 408, the flight scheduler module 252 may select a type of UAV to deliver the order based on the weather forecast and fleet availability. The flight scheduler module 252 may select larger UAVs and/or forward flight UAVs to perform deliveries at times forecasted to include heavier winds, for example.

At 410, the cause deployment of the UAVs per the schedule. The process 400 may continue at 402, and thus may provide continual updating based on more recent weather information. Thus, an order may be initially scheduled for delivery at a first time by a first UAV in response to first weather data, and then changed to delivery at a second time by a second UAV in response second weather data that is more current than the first weather data.

Figure 5:
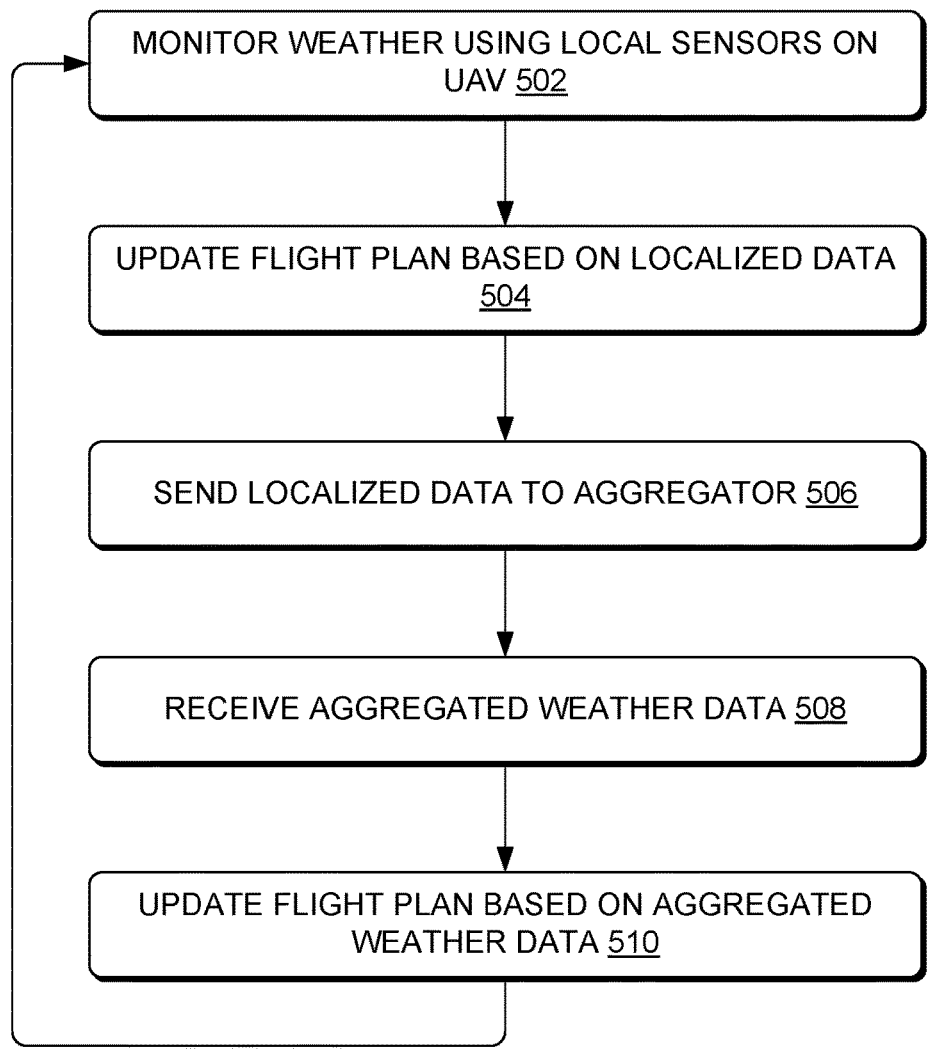
FIG. 5 is a flow diagram of an illustrative process to update flight plans for UAVs based on real-time weather collected by the UAV and/or one or more external sources.

FIG. 5 is a flow diagram of an illustrative process 500 to update flight plans for UAVs based on real-time weather collected by the UAV and/or one or more external sources. The process 500 is described with reference to the environment 100 and the architectures 200 and 240.

At 502, the RTW access module 222 may access weather data from the weather sensors 214 onboard the UAV. The RTW analysis module 224 may analyze the weather data to create weather information and/or alerts usable by the UAV (or the central command 110) to control the UAV. For example, the RTW analysis module 224 may determine a wind speed from raw data provided by the RTW access module 222, which may be compared to a threshold value used to modify a flight plan and/or cause the UAV to discontinue flight and seek a nearby landing site.

At 504, the flight plan module 226 may update the flight plan (or create a new flight plan) based on the localized weather determined at the operation 502. The localized weather may be prioritized over other weather data from external sources since the localized weather may be more current and more accurately indicates weather conditions that affect the UAV. In some embodiments, the operation 504 may include updating controls of the UAV, but not necessarily updating a waypoint of the UAV, for example.

At 506, the UAV may send local weather data obtained by the weather sensors 214 to a weather aggregator, such as the weather aggregator 122, possibly via the central command 110. The local weather data may be used by the weather aggregator to contribute to a dataset of real-time weather data. The local weather data may include a timestamp and location data, such as GPS data.

At 508, the RTW access module 222 may receive aggregated real-time weather data from the weather aggregator. The aggregated real-time weather data may include weather data from multiple different sources, such as the local weather stations 118, the ground vehicles 120, other UAVs 116, and weather aggregators 122. The aggregated real-time weather data may be used by the RTW analysis module 224 to create weather information and/or alerts usable by the UAV to control the UAV. The information obtained at the operation 508 may be more useful for determining flight plan changes rather than control changes since the weather data obtained at 508 is more comprehensive and covers a larger space.

At 510, the flight plan module 226 may update the flight plan (or create a new flight plan) based on the aggregated real-time weather determined at the operation 508. The flight plan module 226 may select a new waypoint or make other changes, possibly including grounding the UAV, based on this aggregated real-time weather data if the data indicates that such action is prudent.

Figure 6:
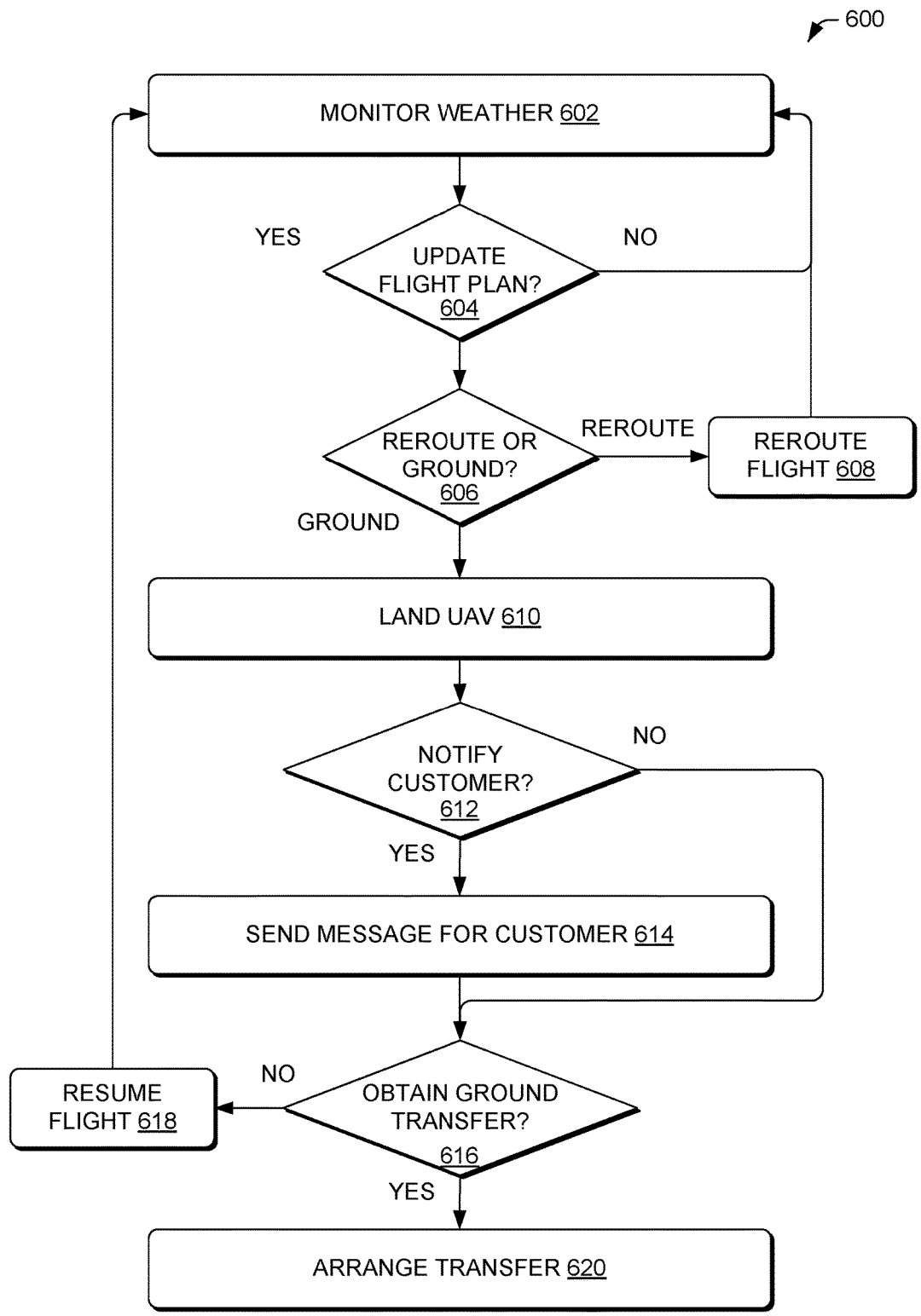
FIG. 6 is a flow diagram of an illustrative process to reroute and/or ground a UAV based on real-time weather.

FIG. 6 is a flow diagram of an illustrative process 600 to reroute and/or ground a UAV based on real-time weather. The process 600 is described with reference to the environment 100 and the architectures 200 and 240.

At 602, the RTW access module 222 and the RTW analysis module 224 may monitor weather data obtained from the weather sensors 214 and/or external entities/devices. The RTW analysis module 224 may create weather information and/or alerts usable by the UAV to control the UAV. In some embodiments, the weather monitoring may be performed at least partly by the weather module 248.

At 604, the flight plan module 226 may determine whether to update the flight plan (or create a new flight plan) for the UAV based on the weather data from the operation 604. In various embodiments, the flight scheduler module 252 may update/create a flight plan for the UAV and use the communication module 254 to transmit the update or new flight plan to the UAV. When the flight plan is not updated (or created) (following the "no" route from the decision operation 604), then the process 600 may continue at the operation 602 by continuing to monitor the weather. When the flight plan is to be updated (or created) (following the "yes" route from the decision operation 604), then the process 600 may advance to a decision operation 606 for further processing.

At 606, the flight plan module 226 (or the flight controller) may determine whether to reroute or ground the UAV. For example, when the monitored weather from the operation 802 indicates extremely gusty winds or that the UAV is heading into a storm, then the UAV may determine to reroute or land (ground). In some embodiments, the flight scheduler module 252 may provide this information to the UAV. When the flight plan or control is to be rerouted (following the "reroute" route from the decision operation 606), then the process 600 may continue at an operation 608, which may reroute the UAV to avoid adverse weather and/or minimize travel through bad weather (e.g., high winds, precipitation, etc.). Following the operation 608, the process 600 may loop back to the operation 602 until the flight has concluded.

When the flight plan or control is to ground the UAV (following the "ground" route from the decision operation 606), then the process 600 may advance to an operation 610. At 610, the UAV may land at a predetermined nearby landing site or at a suitable landing site determined by surveying land below the UAV (e.g., using image collection and analysis, etc.).

At 612, the message module 230 may determine whether to notify a customer of the grounding from the operation 610, which will delay the arrival of the package for the customer. The decision may be based on whether the UAV has connectivity to other devices, such as the central command 110, another UAV, a ground vehicle, or other entities. When the messaging module 230 determines to transmit a message to the customer (following the "yes" route from the decision operation 614), then the process 600 may advance to an operation 612 and send a message to the customer, possibly via the central command 110 or anther device. The message may provide a notification of a delay, a new delivery time, and/or may enable the customer to change delivery and/or cancel the order. Following the operation 614, or when the messaging module 230 determines not to transmit a message to the customer (following the "no" route from the decision operation 614), then the process 600 may advance to a decision operation 616.

At 616, the flight plan module 226 may determine whether to obtain ground transfer of the package, the UAV, or both. For example, when weather conditions limit flight of the UAV, but do not impact travel by ground vehicles, the UAV may transfer a package to a ground vehicle to complete the delivery. In some embodiments, the UAV may also be transported by the ground vehicle. When the flight plan module determines not to obtain a ground transfer (following the "no" route from the decision operation 616), then the process 600 may advance to an operation 618 and resume flight as described further below. The process 600 may continue to the operation 602 and continue until the UAV has concluded its task or flight.

When the flight plan module determines to obtain a ground transfer (following the "yes" route from the decision operation 616), then the process may advance to an operation 620 to arrange a transfer.

Figure 7:
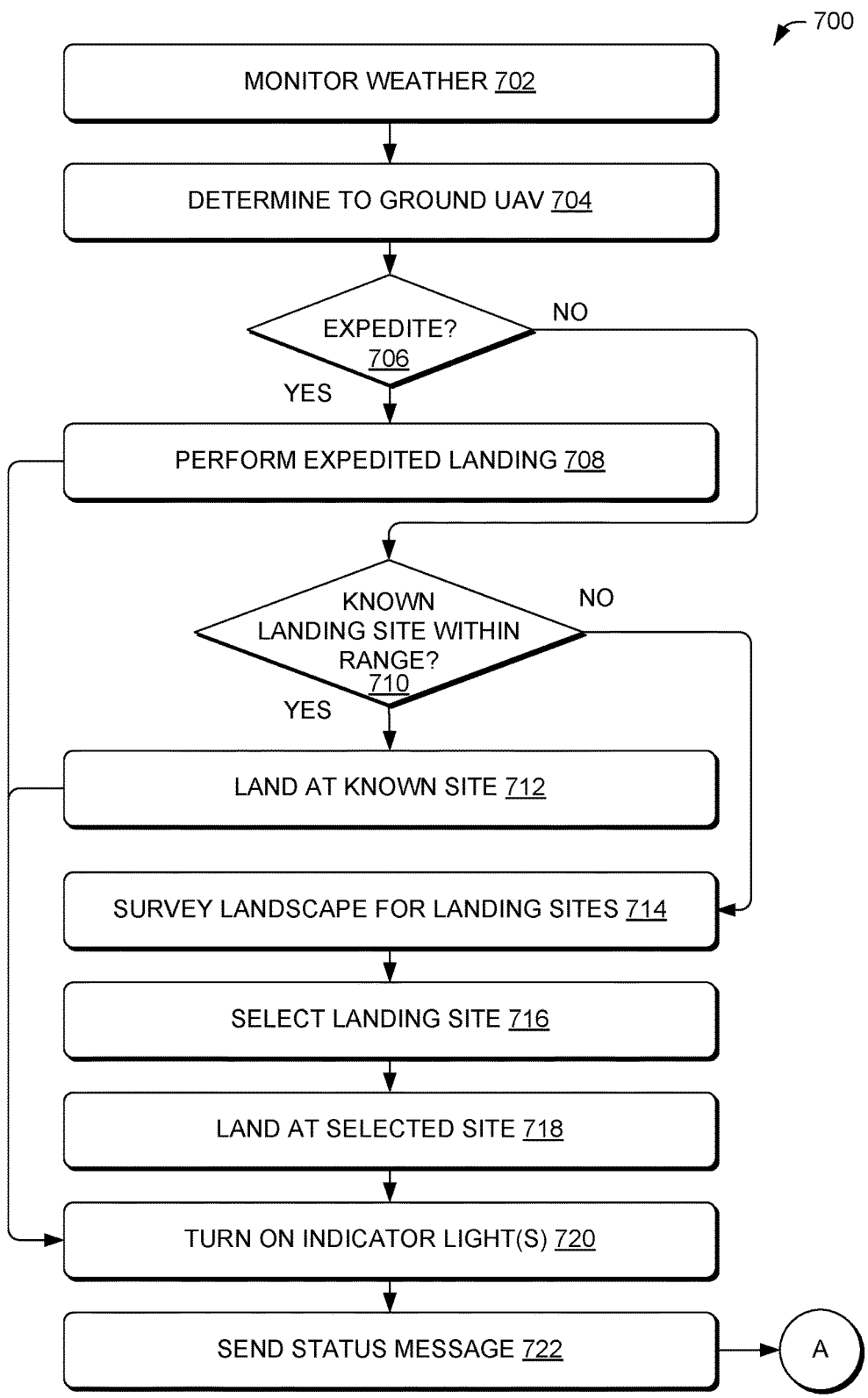
FIG. 7 is a flow diagram of an illustrative process to ground a UAV based on real-time weather and other factors.

FIG. 7 is a flow diagram of an illustrative process 700 to ground a UAV based on real-time weather and other factors. The process 700 is described with reference to the environment 100 and the architectures 200 and 240.

At 702, the RTW access module 222 and the RTW analysis module 224 may monitor weather data obtained from the weather sensors 214 and/or external entities/devices. The RTW analysis module 224 may create weather information and/or alerts usable by the UAV to control the UAV. In some embodiments, the weather monitoring may be performed at least partly by the weather module 248.

At 704, the flight plan module 226 and/or the flight controller 228 may determine to ground the UAV based on the weather data from the operation 702. In some embodiments, a command to ground the UAV may be received from the central controller 110.

At 706, the grounding module 232 may determine whether the grounding is to be expedited, and thus made with a shortened time threshold. The time threshold may be based on the weather data from the operation 702. When the grounding is to be expedited (following the "yes" route from the decision operation 706), then the process 700 may advance to an operation 708 to perform an expedited landing at 708. The expedited landing may be performed by landing the UAV within a time threshold allocated for the expedited landing. The landing site for the expedited landing may be generally below the UAV or within sight of the UAV at the time of the indication of the expedited landing command. When the grounding is to not expedited (following the "no" route from the decision operation 706), then the process 700 may advance to a decision operation 710.

At 710, the grounding module 232 may determine whether a known (predetermined) landing site is within range of the UAV and within a time threshold associated with grounding the UAV and/or in a direction that is feasible given the weather conditions determined at the operation 702. When a known landing site is within range (following the "yes" route from the decision operation 710), then the process 700 may advance to an operation 712 to cause the UAV to select and land at the known landing site at 712.

When a known landing site is not within range or unknown (following the "no" route from the decision operation 710), then the process 700 may advance to an operation 714. At 714, the grounding module 232 may survey landscape for suitable landing sites, such as landing sites that are clear of obstructions, clear of people and other living beings, and possibly include shelter from the weather identified at the operation 702. The grounding module 232 may utilize machine vision algorithms that use imagery captured by image sensors onboard the UAV.

At 716, the grounding module 232 may select a landing site based on the data collected and analyzed at the operation 714. At 718, the UAV may land at the selected site.

Following any one of the operations 708, 712, or 718, the UAV may proceed to an operation 720 after landing. At 720, the UAV may turn on indicator lights and/or emit a sound that provides an indicator of an operability of the UAV. For example, if the UAV is disabled, it may initiate a first light color/pattern (e.g., display red lights, etc.) and when the UAV is temporarily grounded, the UAV may initiate a second light color/pattern (e.g., display yellow lights, etc.). In some embodiments, the lights may provide a readable message to indicate the status to bystanders. In some embodiments, the UAV may be equipped with sensors to detect tampering of the UAV by a foreign object. For example, the sensors may cause emission of a distress signal upon determining that a foreign object (e.g., a person, an animal, etc.) is tampering with the UAV.

At 722, the UAV may send a message to the customer, possibly via the central command 110 or anther device. The message may enable the customer to change delivery and/or cancel the order, for example. The message may provide a new delivery time or a notification of the delay. The process 700 may continue from the operation 722 to a decision operation 802 shown in FIG. 8.

In some embodiments, the UAV may determine to land at a destination, such as on property controlled by a customer. The UAV may initiate a communication with the customer to request permission to land on the property and stay grounded for an estimated amount of time. The grounding may be based on weather or other factors. In various embodiments, the UAV may communicate with the customer using the customer's Wi-Fi, mobile phone, or other communication device, possibly using information accessible via the customer's account.

Figure 8:
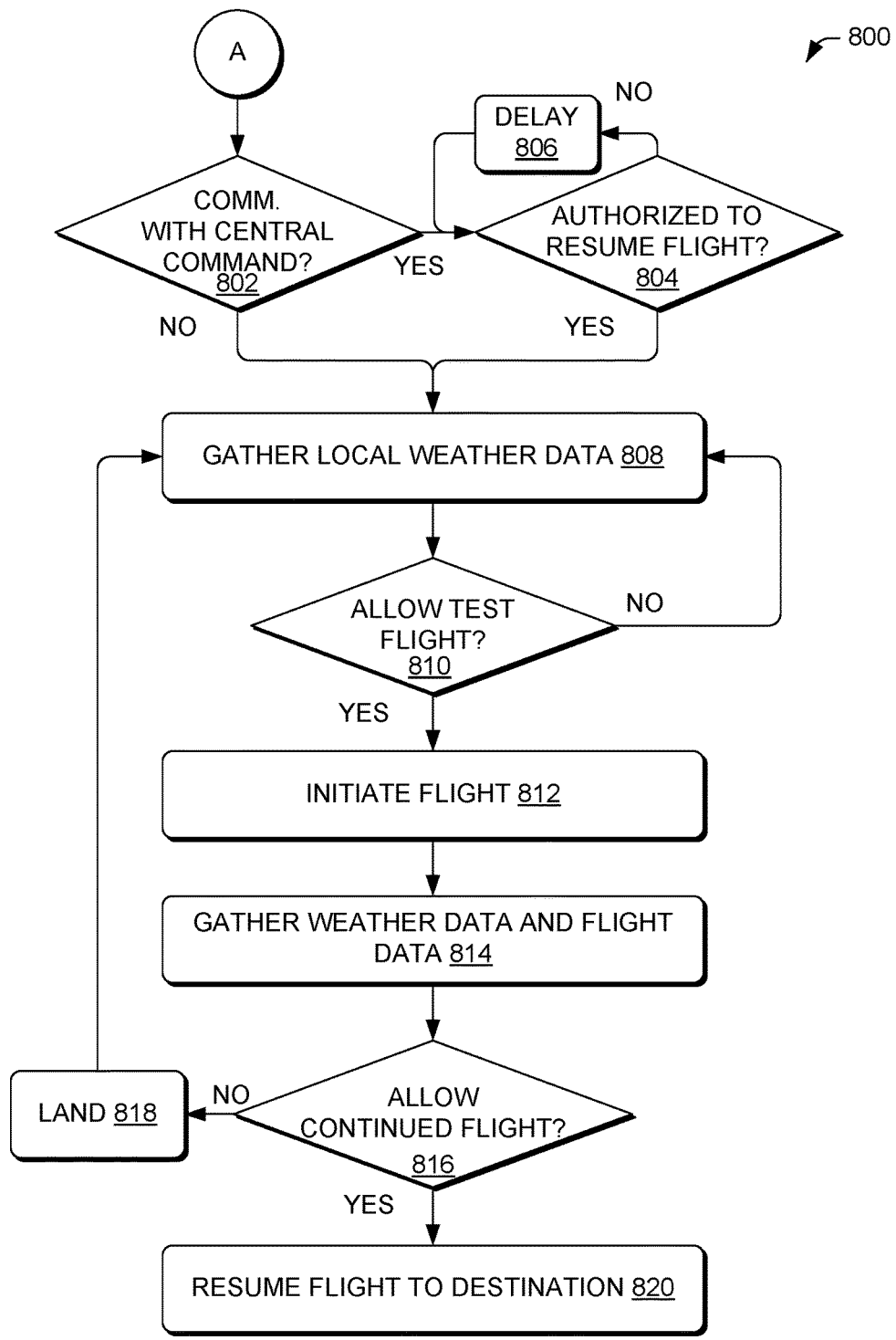
FIG. 8 is a flow diagram of an illustrative process to resume flight after grounding a UAV based on real-time weather.

FIG. 8 is a flow diagram of an illustrative process 800 to resume flight after grounding a UAV based on real-time weather. The process 800 is described with reference to the environment 100 and the architectures 200 and 240. The process 800 may continue from the operation 722 described above with reference to FIG. 7.

At 802, the grounding module 232 may determine whether communication with the central command 110 is available. When communication is available (following the "yes" route from the decision operation 802, then the process 800 may advance to a decision operation 804.

At 804, the grounding module 232 may determine whether the central command 110 authorizes the UAV to resume flight. When the grounding module 232 is not authorized to resume flight (following the "no" route from the decision operation 806), then the process 800 may initiate a delay at 806 and then retry at the decision operation 804. Following the "no" route from the decision operation 802 or the "yes" route from the decision operation 804, the process 800 may advance to an operation 808.

At 808, the RTW access module 222 and the RTW analysis module 224 may monitor weather data obtained from the weather sensors 214 and/or external entities/devices while the UAV is grounded. The RTW analysis module 224 may create weather information and/or alerts usable by the UAV to determine whether resuming flight is prudent, such as by determining that weather conditions are within threshold ranges.

At 810, the grounding module 232 may determine whether to allow a test flight to continue to monitor weather and resume travel to the destination (or another destination) pending additional monitoring of the weather. When the grounding module 232 determines not to perform a test flight (following the "no" route from the decision operation 810), then the process 800 may return to the operation 808. When the grounding module 232 determines to perform a test flight (following the "yes" route from the decision operation 810), then the process 800 may advance to an operation 812.

At 812, the grounding module 232 may cause the UAV to initiate flight, such as by sending a signal to the flight controller 228 that performs controls for a lift-off process. The flight may be staged with checkpoints, which check weather conditions to determine if continued flight is prudent, as described below.

At 814, the UAV may gather additional weather data and flight data, which may not be possible at a location where the UAV landed due, such as when the landing site is at least partially sheltered from weather or otherwise does not experience the same weather at a higher elevation in the air (e.g., at or near a cruising altitude of the UAV).

At 816, the grounding module 232 or the flight controller 228 may determine whether to allow continued flight based on the weather data from the operation 814. The operation 814 and the decision operation 816 may be looped while the UAV climbs to a cruising altitude. When the grounding module 232 determines not to allow continued flight (following the "no" route from the decision operation 816), then the process 800 may advance to an operation 818 to instruct the UAV to land. The UAV may return to the prior landing site or a new landing site as discussed above with reference to the process 700. When the grounding module 232 or the flight controller 228 allow continued flight (following the "yes" route from the decision operation 816), then the process 800 may advance to an operation 820 to resume flight to the prior destination or another new destination, such as when the UAV is rerouted or the delivery is rescheduled, etc.

Figure 9:
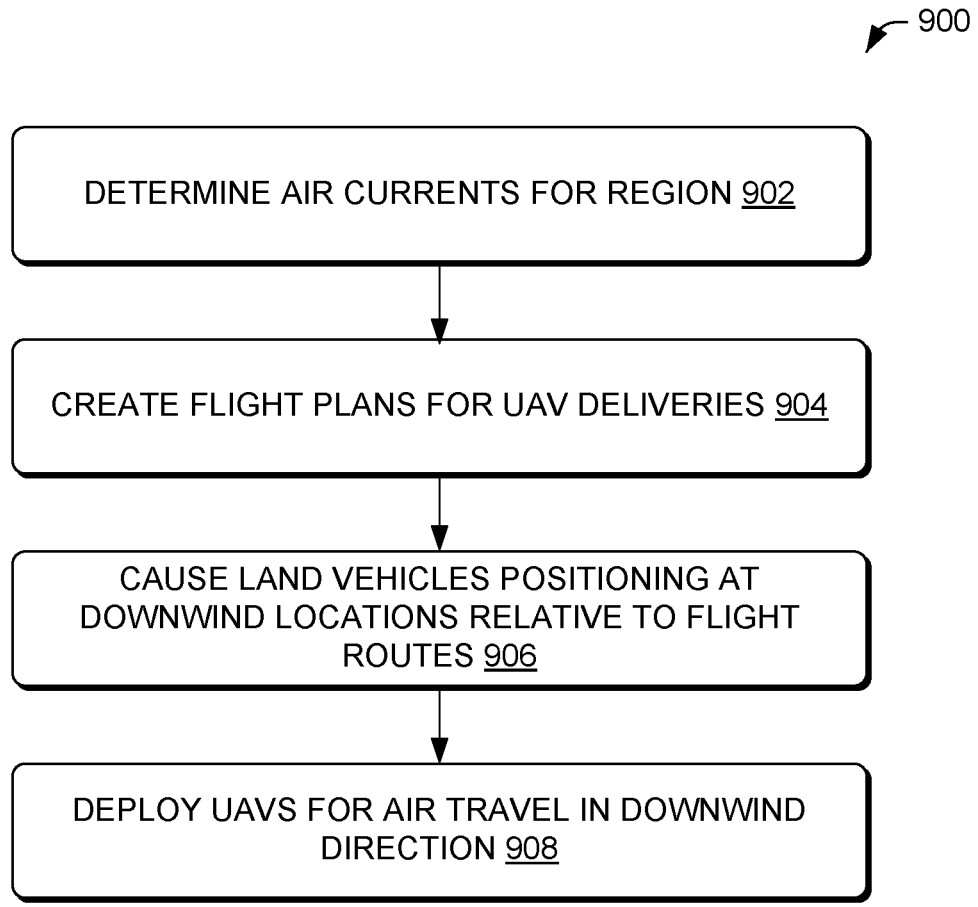
FIG. 9 is a flow diagram of an illustrative process to create flight plans that optimize travel in a downwind direction.

FIG. 9 is a flow diagram of an illustrative process 900 to create flight plans that optimize travel in a downwind direction. The process 900 is described with reference to the environment 100 and the architecture 240.

At 902, the weather module 248 may determine air currents for a region. The air currents may provide a general direction of air movement (wind) which may be leveraged by UAV to expedite flight and/or travel using less power resources than traveling without the airflow (i.e., travel generally with the wind or with the air current). The air currents may be specific to a cruising altitude of the UAVs and/or other altitudes. The air currents may be associated with waypoints and/or other geographical references.

At 904, the flight scheduler module 252 may create flight plans for UAVs deliveries exploit the airflow such to schedule the UAVs to travel generally along with a wind flow or air current where possible and practical.

At 906, the flight scheduler 252 may cause ground vehicles to be positioned at downwind locations relative the flight paths of the UAVs. The ground vehicles may then collect the UAVs and transport the UAVs to upwind locations.

At 908, the flight scheduler module 252 may deploy the UAVs for travel along with the wind flow and air current. The UAVs may be deployed from the fulfillment center or from a ground vehicle that positions the UAV at an upwind location relative to a destination of the UAV.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An item distribution system comprising:
one or more processors; and
memory storing computer-executable instructions that, when executed, cause the one or more processors to:
receive an order for an item to be delivered to a destination;
determine a weather forecast for an area that includes routes to the destination;
provide delivery options based at least in part on the weather forecast and the item, the delivery options including transit by at least an unmanned aerial vehicle (UAV) and a ground vehicle having different time windows for estimated delivery of the item;
receive a delivery selection of one of the delivery options, the delivery selection being delivery by the UAV;
create a first flight plan for the UAV based on the delivery selection;
deploy the UAV to deliver the item using the first flight plan;
receive near-real-time weather data during flight of the UAV; and
instruct the UAV to execute a second flight plan based on the near-real-time weather data.

2. The item distribution system as recited in claim 1, wherein the computer-executable instructions further cause the one or more processors to:
receive UAV weather data captured by sensors onboard the UAV;
receive other weather data captured by sensors from at least one of a weather station, another ground vehicle, or another UAV; and
aggregate the UAV weather data with the other weather data to create the near-real-time weather data.

3. The item distribution system as recited in claim 1, wherein the computer-executable instructions further cause the one or more processors to instruct the UAV to land prior to the destination based at least in part on the near-real-time weather data.

4. The item distribution system as recited in claim 1, wherein the computer-executable instructions further cause the one or more processors to:
determine air streams associated with airspace between potential origination locations and the destination;
determine to shuttle the UAV with the ground vehicle for a segment of a route toward the destination; and
select an origination location from the potential origination locations to increase range of flight in a direction along with an airstream moving toward the destination.

5. An unmanned aerial vehicle (UAV) comprising:
a flight controller; and
memory storing computer-executable instructions that, when executed, cause the flight controller to:
receive a flight plan prior to deployment of the UAV;
initiate flight toward a destination included in the flight plan;
receive first weather data from sensors onboard the UAV;
determine to ground the UAV prior to reaching the destination based at least in part on the first weather data;

determine whether to perform an expedited landing based at least in part on the first weather data, the expedited landing being a UAV landing with a shortened time threshold;

transmit a notification of a delay in response to occurrence of the expedited landing;

receive second local weather data from at least one of sensors onboard the UAV or from an external data source while the UAV is grounded; and resume flight based at least in part on the second local weather data.

6. The UAV as recited in claim 5, wherein the instructions further cause the flight controller to receive a weather forecast from a central command as the external data source, and wherein resuming the flight is further based at least in part on the weather forecast.

7. The UAV as recited in claim 5, wherein the first weather data indicates a headwind velocity that is greater than a threshold velocity.

8. The UAV as recited in claim 5, wherein the instructions further cause the flight controller to send a message to a central command, the message including at least a reason for grounding the UAV.

9. The UAV as recited in claim 5, wherein the instructions further cause the flight controller to:

determine a distance range of allowable flight prior to landing the UAV based at least in part on the first weather data;

determine whether preselected landing sites are within the distance range; and selecting at least one of:

a preselected landing site that is within the distance range; or an ad hoc landing site that is within the distance range.

10. The UAV as recited in claim 9, wherein the instructions further cause the flight controller to:

determine that the preselected landing sites are not within the distance range;

survey landscape for the ad hoc landing site;

capture imagery of the landscape;

analyze the imagery to identify a landing site that at least shelters the UAV from weather conditions identified in the first weather data; and cause the UAV to land at the landing site.

11. The UAV as recited in claim 5, wherein the instructions further cause the flight controller to perform a flight test prior to resuming the flight to the destination, the flight test including at least:

flying to at least a threshold elevation;

receiving third weather data; and analyzing the third weather data to determine whether to proceed with flight or return to ground.

12. A method to control an unmanned aerial vehicle (UAV), the method comprising:

receiving a first flight plan;

initiating flight, using the first flight plan, toward a destination included in the first flight plan;

determining an estimated arrival time;

receiving first weather data from a different UAV that collects weather data during flight;

capturing second weather data from sensors onboard the UAV;

determining whether to change the destination based on the first weather data and the second weather data;

determining a second, different flight plan based on the first weather data and the second weather data; and transmitting a notification indicating a delayed arrival time in response to use of the second flight plan.

13. The method as recited in claim 12, wherein the first weather data is near real-time aggregated weather data relayed from the different UAV, to the UAV, by a central command.

14. The method as recited in claim 12, further comprising determining to ground the UAV prior to reaching the destination based at least in part on the second weather data.

15. The method as recited in claim 14, wherein the second weather data indicates at least one of a headwind velocity that is greater than a threshold velocity, a visibility less than a threshold distance, or a threshold likelihood of freezing precipitation.

16. The method as recited in claim 14, further comprising, after landing the UAV, performing at least one of:

transmitting a distress signal; or activating a light, a speaker, or both indicating a functionality state of the UAV.

17. The method as recited in claim 14, further comprising:

determining a range of allowable flight prior to landing the UAV based at least in part on the second weather data; and coordinating with a ground vehicle that is within the range for transportation.

18. The method as recited in claim 14, further comprising:

capturing imagery of ground proximate to the UAV;

analyzing the imagery to identify a landing site that at least shelter the UAV from weather conditions identified in the second weather data; and landing the UAV at the landing site.

19. The method as recited in claim 12, further comprising:

determining to ground the UAV prior to reaching the destination based at least in part on the second weather data;

capturing third weather data while grounded; and resuming flight based at least in part on the third weather data.

20. The method as recited in claim 12, further comprising sending the second weather data to a central command.

* * * * *